2,826,516

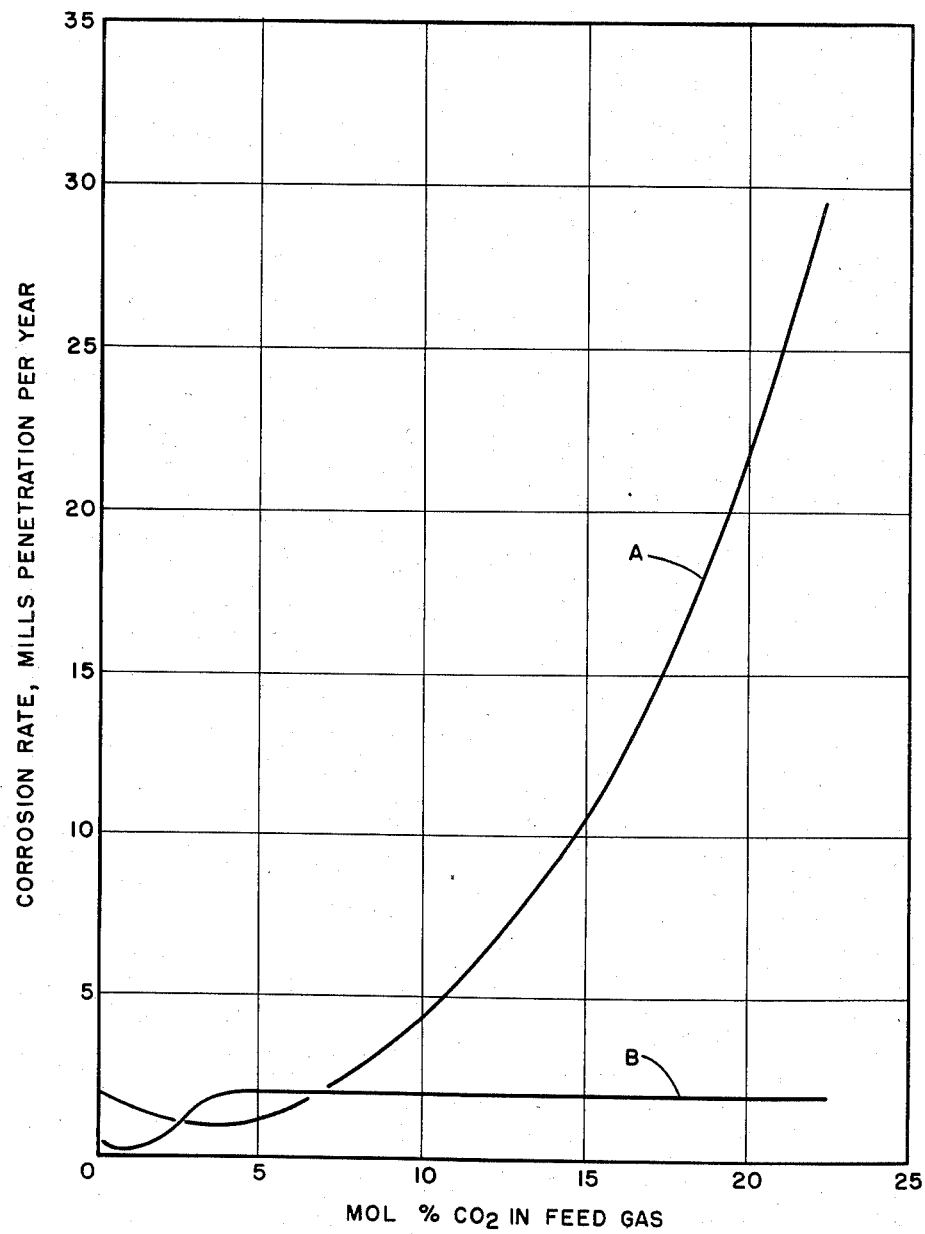

PROCESS FOR INHIBITING CORROSION BY CARBON DIOXIDE IN ALKYLOL AMINE SYSTEMS

H. R. Froning and Richard L. Langworthy, Tulsa, Okla., assignors to Pan American Petroleum Corporation, a corporation of Delaware Application March 26, 1956, Serial No. 574,015

9 Claims. (Cl. 148—6.14)

Our invention relates to a novel method of inhibiting corrosion. More particularly it pertains to a novel method for inhibiting corrision of ferrous metal surfaces exposed to carbon dioxide.

Corrosion of ferrous metal-containing surfaces by carbon dioxide is a well recognized phenomenon. This type of corrosion is found to be particularly serious in the well known alkylol amine acid gas separation systems, corrosive action generally being most prevalent in that portion of the system in which the free alkylol amine is regenerated and the carbon dioxide liberated. Accelerated corrosion in the regenerator is probably due to the combination of high temperatures required for regeneration plus the relatively high concentration of carbon dioxide in that portion of the system.

Specific instances in which corrosion of the above mentioned type occurs are found in the manufacture of liquid and/or solid carbon dioxide. Carbon dioxide used for the preparation of either the liquid or solid product is usually obtained from the fermentation industry or certain types of industrial waste gases such as, for example, those obtained from causticizing lime kilns, the combustion of high purity coke, etc. To recover carbon dioxide from gaseous streams of the aforesaid type alkylol amine solutions of various kinds are employed.

The preparation of feed gas in the manufacture of ammonia, methanol, for the Oxo reaction, and for hydrocarbon synthesis presents similar corrosion problems. The difficulty involved in feed preparation for any of the uses just mentioned is concerned at one stage thereof with the separation of carbon dioxide. Thus such feed gas may be prepared by first either reforming methane with steam and oxygen as shown by the equation

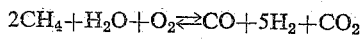

or by the partial combustion of methane as shown by the equation

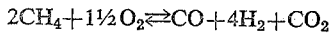

The product gases in either case are run through amine absorption systems to remove the carbon dioxide therefrom and the resulting hydrogen and carbon monoxide may be submitted to water gas shift conditions, for example, in the presence of steam if it is desired to increase the hydrogen concentration. In accomplishing this the carbon monoxide present is converted into carbon dioxide which is removed by again treating the gaseous mixture with an alkylol amine in the manner generally indicated above. The separation of carbon dioxide from any of the above mentioned gas streams by means of an alkylol amine type absorption unit followed by liberation of the carbon dioxide from the alkylol amine gives rise to serious corrosion problems, particularly in the amine regenerator. This has been found to be true even in instances where stainless steel equipment was used.

In the past, various corrosion inhibitors have been employed with very little, if any, practical success. Most success in avoiding this type of corrosion seems to have resulted from having maintained the regenerated temperature as low as possible. However, this method has very definite limitations inasmuch as decomposition of the alkylol amine carbonate is aided substantially by increased temperature which in turn require higher pressures.

Accordingly, it is an object of our invention to provide a means whereby the corrosive action of carbon dioxide on ferrous metal surfaces in the presence of alkylol amine solutions is inhibited by the use of silica or a substance capable of releasing a soluble silica compound into said solution under the conditions employed for regenerating said alkylol amines. It is a further object of our invention to provide a method for depositing a corrosion resistant coating on metal surfaces normally corrodible by the action of carbon dioxide thereon in the presence of said alkylol amine solutions.

Broadly, the process of our invention involves inhibiting corrosion of equipment used in the regeneration of alkylol amines in the presence of carbon dioxide by either adding a soluble compound of silica to alkylol amine solutions or by placing a compound containing silica in an appropriate part of the acid gas separation system so that said solution is substantially constantly in contact with said compound thereby resulting in and maintaining a suitable concentration of silica in the alkylol amine solution. This can be done for example by suspending in the alkylol amine solution a steel basket containing a soluble silica compound. The desired concentration of silica in solution may also be obtained by placing a suitable ceramic packing either in the regenerator tower or in the reboiler section thereof. Other materials which can be used as a source of silica in the alkylol amine solution are silica gel, glass beads, water glass, quartz chips and the like.

Any of the amine compounds previously employed for recovering acid gases may be used for carrying out the process of our invention; for example, monoethanolamine, diethanolamine or triethanolamine may be used either in the form of either aqueous solutions or as glycol solutions thereof. In this connection when we employ the expression "alkylol amine" in the present description and claims we intend to include amines such as morpholine which is also capable of separating carbon dioxide from gaseous mixtures of the type contemplated.

Ordinarily the occurrence of corrosion in systems of the type disclosed herein increases with increasing concentration of the alkylol amine in solution and/or increasing concentrations of carbon dioxide. While corrosion of this type is inhibited in a very satisfactory manner by the incorporation of soluble silica in alkylol amine solutions of substantially any concentration, we generally prefer to use such solutions in concentrations ranging from about 10 to about 40 weight percent, for example, from about 15 to 20 weight percent.

Silica concentrations in the alkylol amine solutions suitable for inhibiting corrosion may vary widely, the amount required for any given circumstance depending upon the severity of the conditions employed. In most of the systems normally encountered, however, silica in solution in concentrations ranging from about 0.05 weight percent up to the concentration at which the solution employed is saturated with respect to silica will be found to be satisfactory. In this regard the expressions "soluble silica" or "soluble silica compound" is not necessarily intended to mean that the silica is completely soluble in the alkylol amine solution. Solubility to such an extent is ordinarily unnecessary to secure the desired degree of corrosion inhibition. Hence, any silica-containing compound that is only slightly (for example, 0.05 weight percent) soluble in said solution should be satisfactory.

The mechanism by which silica inhibits corrosion of ferrous metal surfaces under the above mentioned conditions is not accurately understood. X-ray diffraction studies on steel coupons being subjected to the corrosive action of carbon dioxide in the presence of hot alkylol amine solutions and silica, however, indicate that an iron silicate film tends to form on the metal surface thereby tending to inhibit further corrosion. While this may be a logical explanation of the action occurring in the system, it is to be strictly understood that we are not limited by this procedure, but only by the procedure set forth in the accompanying claims which procedure when followed results in corrosion inhibition.

The process of our invention may be further described by reference to the following specific example.

EXAMPLE

Equal portions (600 ml.) of an aqueous 10 weight percent monoethanolamine solution were saturated with gas streams having the compositions indicated in the table below. This step was carried out at atmospheric temperature and pressure. Individual mild steel test panels (18 gauge, ½" x 1"), previously cleaned, dried and weighed were then suspended in the alkylol amine solution by means of a glass hook. All of the containers in which the solution was placed were of stainless steel. Prior to the actual test and before the test panels were placed in solution 10 grams of Pyrex glass chips were placed in five of the stainless steel vessels and the aqueous amine silution therein boiled for a period of 12 hours. Thereafter, the solutions in both groups of vessels were boiled at 212° F. under total reflux for a period of 168 hours. The loss in weight observed under the two different sets of conditions is indicated in the table below.

Table

| Composition of Saturating Gas, Mol Percent | Average Coupon Weight Loss, gms. | |
|---|---|---|
| | Stainless Steel Vessel— No glass added | Stainless Steel Vessel+ Glass |
| 22.3% $CO_2$, 77.7% $H_2$ | .2407 | .0153 |
| 1.6% $CO_2$, 98.4% $N_2$ | .0419 | .0022 |
| 100% $N_2$ | .0164 | .0044 |
| .06% $H_2S$, 99.9% $N_2$ | .0391 | .0497 |
| 1.5% $H_2S$, 16.6% $CO_2$, 81.9% $N_2$ | .0126 | .0124 |

From the above results it may be seen that the addition of glass chips to the mixtures containing carbon dioxide only as the acidic gas reduced the corrosion rate by 15 to 20 times. When the saturating gas contained 22.3 percent carbon dioxide and 77.7 percent nitrogen, the corrosion rate was reduced from 33 mills' penetration per year to 2 mills' penetration per year. When nitrogen was used as the saturating gas the corrosion rate was reduced by a factor of 4. It will also be seen that our invention does not apply to solutions containing hydrogen sulfide or mixtures of hydrogen sulfide and carbon dioxide.

The advantages to be gained by the use of our invention in inhibiting corrosion in systems of the type contemplated herein are very clearly illustrated by the graph in the accompanying drawing. Curve A represents corrosion, in terms of mills of penetration per year, obtained in a 10 weight percent monoethanolamine solution at 212° F. in the absence of silica and containing varying amounts of carbon dioxide and nitrogen. The data on which both curves A and B are based were obtained in accordance with the procedure outlined in the above example, however, only carbon dioxide was used as the corrosive gas. Increase in the carbon dioxide concentration had very little effect on corrosion rate beyond carbon dioxide concentration of 8 mol percent, in the case of curve B which represents the extent of corrosion in mixtures containing soluble silica in an amount corresponding to about 0.1 weight percent.

While we have described the applicability of our invention to the inhibition of corrosion in mild steel, it is to be understood that such invention is likewise applicable to any ferrous metal equipment or surface in which the iron therein tends to dissolve as a result of the action of the hot carbon dioxide-containing solution thereon. Specific examples of other materials that can be protected from corrosion in accordance with our invention include stainless steel and carbon steel.

We claim:

1. A method for inhibiting corrosion of ferrous metal surfaces in the absence of hydrogen sulfide by the combined action of carbon dioxide and an alkylol amine solution which comprises supplying silica in a soluble form to said solution.

2. In the recovery of carbon dioxide from hydrogen sulfide-free gases by means of an alkylol amine solution to form a reaction product from said alkylol amine and carbon dioxide and subsequently liberating said carbon dioxide from the alkylol amine by means of heat in ferrous metal equipment, the improvement which comprises inhibiting corrosion of the ferrous metal surface with which the solution of said reaction product and liberated carbon dioxide and free alkylol amine come in contact during said liberation or regeneration step by supplying silica in a soluble form to said solution.

3. The process of claim 2 in which the alkylol amine is monoethanolamine.

4. The process of claim 2 in which the alkylol amine is diethanolamine.

5. The process of claim 3 in which glass is employed as the source of silica.

6. The process of claim 3 in which water glass is employed as the source of silica.

7. In the recovery of carbon dioxide from hydrogen sulfide-free gases by means of an alkylol amine solution to form a reaction product from said alkylol amine and carbon dioxide and subsequently liberating said carbon dioxide from the alkylol amine by means of heat in ferrous metal equipment, the improvement which comprises inhibiting corrosion of the ferrous metal surface which comes in contact with a hot solution of said alkylol amine as well as dissolved and gaseous carbon dioxide by supplying silica in a soluble form to said solution.

8. A method for depositing a coating consisting essentially of iron silicate on a mild steel surface and thereby inhibiting further corrosion of said surface which comprises contacting the latter with a hydrogen sulfide-free atmosphere containing carbon dioxide and with a hot solution of an alkylol amine containing carbon dioxide but free from hydrogen sulfide, said solution having silica dissolved therein.

9. A method for depositing a coating consisting essentially of iron silicate on a steel surface and thereby inhibiting further corrosion of said surface which comprises contacting the latter with a hydrogen sulfide-free atmosphere containing carbon dioxide and with a hot solution of an alkylol amine containing carbon dioxide but free from hydrogen sulfide, said solution having silica dissolved therein.

References Cited in the file of this patent

UNITED STATES PATENTS 1,555,798    Gravell _____ Sept. 29, 1925

OTHER REFERENCES

"Triethanolamine, an Absorbent for Acid Gases," Carbide and Carbon Chemical Corporation, July 1, 1930.

Speller: "Corrosion, Causes and Prevention," 1st ed., 1926, McGraw-Hill Book Co., Inc., New York, pages 348–351 relied on.